United States Patent [19]

Paszyc et al.

[11] 3,945,920

[45] Mar. 23, 1976

[54] COANDA EFFECT OIL-WATER SEPARATOR

[75] Inventors: Aleksy J. Paszyc, Ventura; Dharam Pal, Woodland Hills; John B. Curry, Oxnard, all of Calif.

[73] Assignee: The Unites States of America as represented by the Secretary of the Navy, Washington, D.C.

[22] Filed: Oct. 3, 1974

[21] Appl. No.: 511,906

[52] U.S. Cl................ 210/73 W; 55/447; 209/211; 210/84; 210/242 S; 210/DIG. 26; 239/DIG. 7
[51] Int. Cl.² ........................................ B01D 21/26
[58] Field of Search ........... 210/73, 83, 84, 94, 242, 210/512, DIG. 21; 239/DIG. 7; 55/447, 457; 209/144, 211

[56] References Cited
UNITED STATES PATENTS

| | | | |
|---|---|---|---|
| 2,767,840 | 10/1956 | Dobson et al...................... | 209/144 |
| 3,321,891 | 5/1967 | Coanda.................................. | 55/103 |
| 3,656,619 | 4/1972 | Ryan et al............................. | 210/83 |
| 3,766,719 | 10/1973 | McAnally ............................. | 55/457 |
| 3,780,862 | 12/1973 | Mesing.................................. | 210/84 |
| 3,789,988 | 2/1974 | Valibouse et al. .............. | 210/512 R |

FOREIGN PATENTS OR APPLICATIONS

| | | | |
|---|---|---|---|
| 1,302,558 | 7/1962 | France.................................. | 55/447 |

OTHER PUBLICATIONS
Scientific American, Vol. 214, No. 6, June 1966, pp. 84–92.

*Primary Examiner*—Charles N. Hart
*Assistant Examiner*—Robert G. Mukai
*Attorney, Agent, or Firm*—Richard S. Sciascia; Joseph M. St.Amand; David O'Reilly

[57] ABSTRACT

An oil-water separating device utilizing the wall attachment effect for separating oil from an oil-water mixture in a continuous manner. The device is comprised of an oil-water mixture inlet nozzle delivering the mixture into a bounded region inside the separator to form a mixture jet which attaches to one wall creating a separation bubble in the bounded region. The bounded region is provided by a cavity formed by two or more plates joined together with an oil collecting chamber provided on top of the bounded region by an additional plate. The oil is captured in the bounded region by the separation bubble and flows into the oil collecting chamber through connecting holes. The oil in the collecting chamber is transferred by an oil outlet, either by siphoning or by means of a metering pump to an oil storage tank. A multiple stage oil-water separator can be provided by forming a plurality of series-connected, bounded regions between the two plates.

3 Claims, 5 Drawing Figures

COANDA EFFECT OIL-WATER SEPARATOR

BACKGROUND OF THE INVENTION

The present invention relates to methods and apparatus for oil-water separation and more particularly relates to oil-water separators which utilize centrifugation.

Current methods and apparatus for the separation of oil from an oil-water mixture are gravitation, coalescence, ultra filtration as well as centrifugation. Centrifugation is an accepted method for separating water-oil dispersions or emulsions. Commercial equipment for this purpose is available for a wide range of applications. Despite their effectiveness, the power requirement, cost and maintenance of such systems is high.

The gravitation method of separating oil from oil-water mixtures relies upon difference in densities of the two fluids. Such systems are normally slow and bulky. Coalescence has been used quite extensively for removing finely dispersed water droplets from fuels. The basic mechanism behind this separation technique is the formation of larger oil drops on the coalescing material. The resulting larger drops can then be separated by gravity. This method, however, suffers from fouling of the coalescing element, thus requiring frequent maintenance.

SUMMARY OF THE INVENTION

The present invention solves many of these problems by utilizing a concept of an oil-water separator based upon the fluid dynamic phenomenon called wall attachment or Coanda effect, named after its discoverer, Henry Coanda. This effect can be described by considering a thin jet sheet (quasi-two-dimensional) flowing into a bounded region. The jet gets deflected toward an adjacent substantially perpendicular wall. When such wall is relatively close to the jet axis, the jet gets attached to and flows along the wall, enclosing a separation bubble, bounded in a region between the jet and the wall. The jet undergoes considerable curving along the wall during its attachment, thus generating a centrifugal field force on it. This results in a gradual negative pressure gradient between the jet axis and the center of the separation bubble. Further, for a jet composed of a mixture of two immiscible fluids, such as oil and water, a lighter fluid, say oil, flows on the separation bubble side of the jet, whereas water, being heavier, tends to flow away from the separation bubble created by the centrifugal force field. If an outlet is placed at the center of the separation bubble, the accumulated oil can then be tapped out at a rate somewhat smaller than the input oil flow rate. This is the principle of operation of the Coanda effect oil-water separator.

The Coanda effect oil-water separator is a low impedance device because the oil-water mixture is not forced through any porous media for separation nor does it form any strong vortices during its passage through the device. Hence, the power required to operate the device is relatively low. Also, absence of any porous elements eliminates any cleaning required for normal operation of the separator. Since the separator does not utilize any mechanical moving parts other than a mixture circulating an oil transferring pump, it requires less maintenance and has higher reliability than previous devices. Because of the simplicity of design, the maintenance of the system is relatively easy.

OBJECTS OF THE INVENTION

It is one object of the present invention to provide an oil-water separation device utilizing the wall attachment effect.

Another object of the present invention is to provide an oil-water separation device which has relatively low power requirements.

Yet another object of the present invention is to provide an oil-water separating device which minimizes cleaning and maintenance.

Other objects, advantages and novel features of the invention will become apparent from the following detailed description of the invention when considered in conjunction with the accompanying drawings.

DETAILED DESCRIPTION OF THE PREFERRED EMBODIMENT

The Coanda effect oil-water separator includes a jet for directing an oil-water mixture flow against an adjacent wall in such a manner as to create a flow curvature between the jet and the point where the wall attachment or Coanda effect occurs.

The flow curvature creates a centrifugal force resulting in a negative pressure gradient and the formation of a separation bubble. The oil, being the lighter fluid, flows toward the separation bubble, and can be tapped out at a controlled rate while the water flows along the wall toward a separate exit. The Coanda effect is a fluid dynamic phenomenon treated in depth by C. Bourque and B. G. Newman in an article entitled "Reattachment of a Two-Dimensional Incompressible Jet to an Adjacent Flat Plate," the Aeronautical Quarterly, Volume XI, August 1960, pages 201 to 232.

Figure 1:
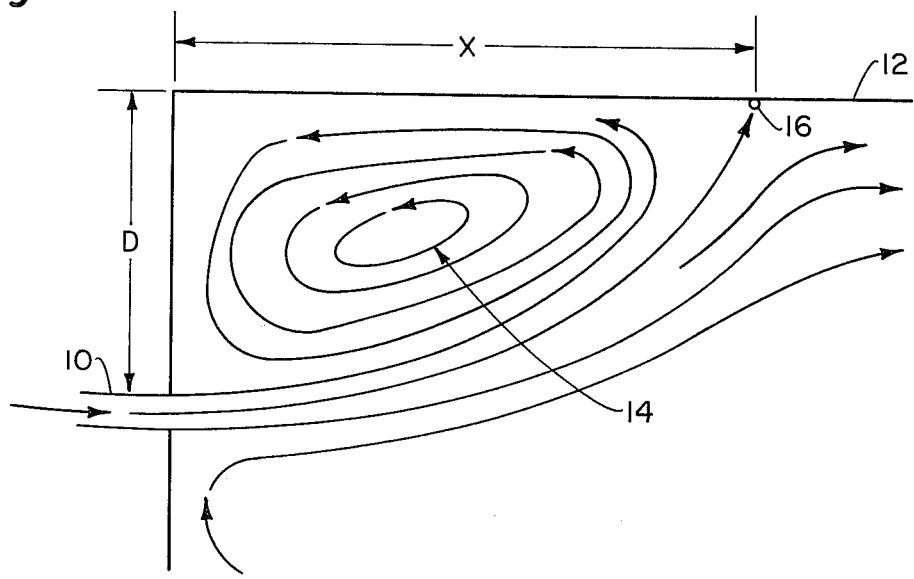
FIG. 1 is a diagram illustrating the fluid dynamic phenomenon called the wall-attachment or Coanda-effect.

The Coanda effect phenomenon can be briefly demonstrated by referring to FIG. 1, which is a diagram illustrating the attachment of a fluid from a two-dimensional jet. Consider a thin jet sheet flowing through a quasi-two-dimensional nozzle 10, as indicated by the arrows into an unbounded region. The jet gets deflected towards an adjacent wall 12. When such wall 12 is relatively close to the jet axis, the jet gets attached to and flows along the wall enclosing a separation bubble 14. As is evident, the jet undergoes considerable curving during its attachment to wall 12 at attachment point 16, thus generating a centrifugal force field on it. This results in a lower pressure in the separation bubble 14.

Using the theory discussed by Bourque and Newman, the length of wall 12 and reattachment distance X can be determined for a given offset D of nozzle 10. For a jet composed of a mixture composed of two fluids, which do not mix such as oil and water, the lighter fluid flowing along the wall 12 seeks the separation bubble 14 and gets trapped by it. If an outlet is provided at the center of the separation bubble 14, the accumulated oil can be tapped out while the remaining mixture flows out of the device. An experimental model showed that for a nozzle 10 having an offset D of about four inches, the length of attachment wall 12 was determined to be approximately 12 inches. For these values, the attachment point 16 occurred at a distance X of approximately 7 inches for a water flow of 1½ gallons per minute through a nozzle of approximately ⅜ of an inch. For much greater flow rates, the relative dimensions of the Coanda effect separator would, of course, have to be increased. However, for mixture flow rates through the separator of 20 – 100 gallons per minute, the relative size of the Coanda effect separator was found to be substantially less than parallel plate separators handling the same volume.

Figure 2:
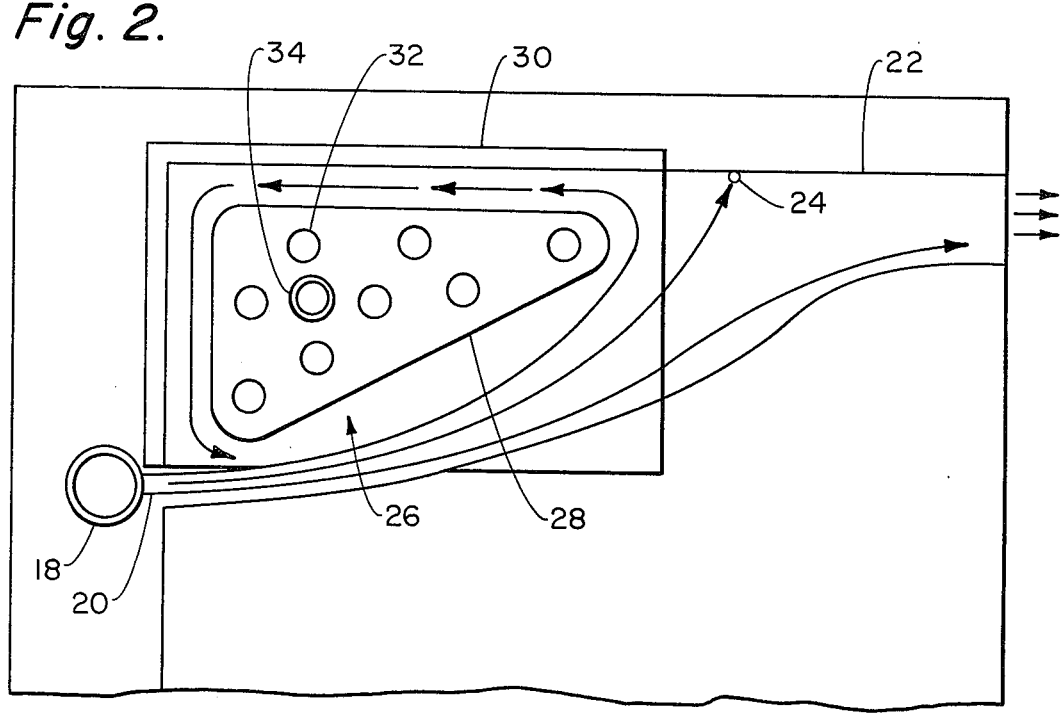
FIG. 2 is a top elevation illustrating the manner in which a single stage Coanda effect oil-water separator would be constructed.

A single stage Coanda effect oil-water separator is shown in FIG. 2. The oil-water mixture enters the separator inlet 18 and flows through nozzle 20 into a bounded region inside the separator to form a mixture jet. The jet attaches to the wall 22 at point 24 and forms a separation bubble 26. An oil collecting chamber 28 is provided on top of the separation bubble 26 and is covered by a plate 30. Under controlled conditions, the oil captured by the separation bubble 26 flows into the chamber 28 through connecting holes 32. Finally, the oil collected in the chamber 28 is transferred either by siphoning or by means of a metering pump to an oil storage tank through an outlet 34. Tests conducted on the device show that a single stage separator is suitable for gross separation only.

Figure 3:
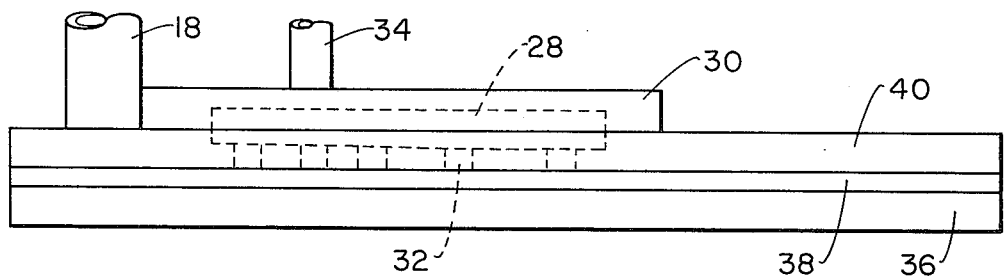
FIG. 3 is a side elevation of the Coanda effect oil-water separator of FIG. 2.

A side view of the single stage separator of FIG. 2 is shown in FIG. 3. The bounded region is formed by three parallel plates 36, 38, and 40 having a cavity between them with inlet 18 being connected to the cavity. The plate 36, 38 and 40 may be of clear plastic, metal, or any other suitable non-corrosive material. The oil collecting chamber 28 is formed between plate 30 and plate 40 with a plurality of holes 32 connecting the oil collecting chamber 28 with the bounded region. Oil collecting chamber 28 is somewhat triangular in shape (FIG. 2) and oil is siphoned off from the chamber through an outlet 34.

Figure 4:
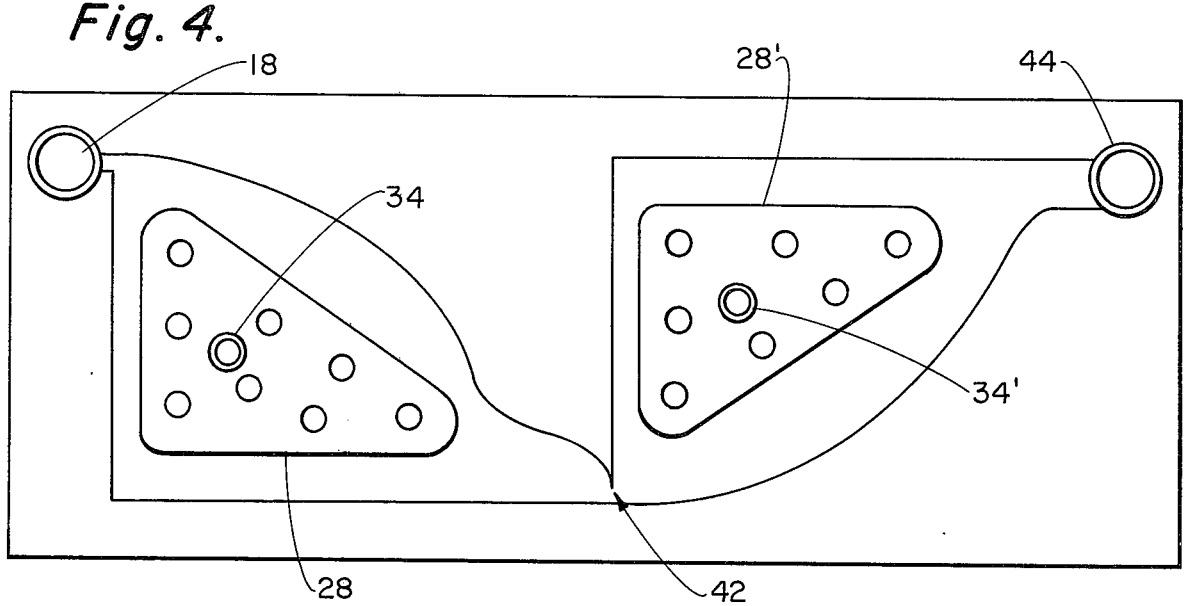
FIG. 4 is a top elevation of a multiple stage Coanda effect oil-water separator.

To make the separator suitable for practical application, staging is desirable. This is shown in FIG. 4. The multistage separator has a first stage with an oil-water mixture inlet 18 and an oil collecting chamber 28 as in the single stage device. To add a second stage, a nozzle is formed at 42 and a bounded region added with dimensions substantially the same as the first stage. The second stage has its oil collecting chamber 28' the same as the first stage and an oil outlet 34'. An outlet for the separated water is provided at 44. A two-stage separator is merely shown to illustrate the manner in which stages would be connected. However, the concept can be extended to any multi-stage separator based upon quality of effluent desired. Also, the stages do not necessarily have to be in line as shown in FIG. 4. They could be at right angles to one another with another third stage added at right angles to the second stage such that inlet 18 and water outlet 14 would be provided on the same side of the device.

Figure 5:
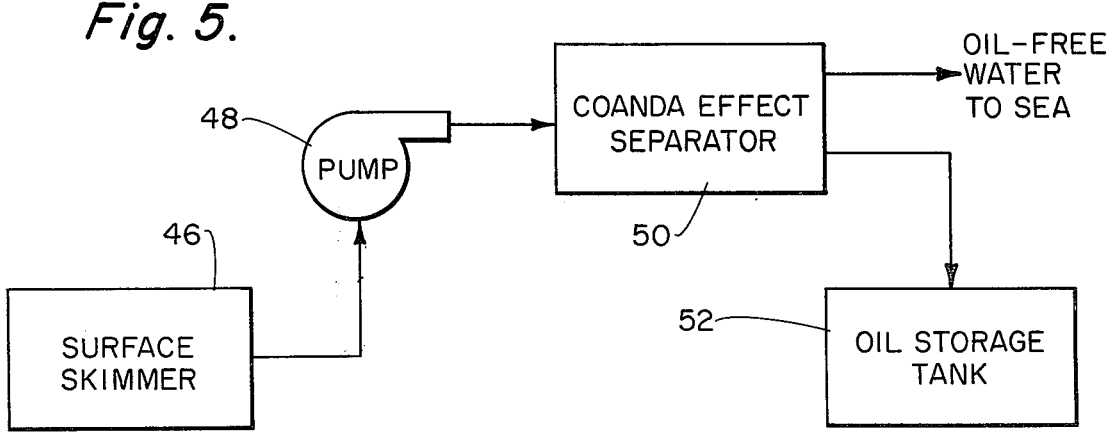
FIG. 5 illustrates the manner in which the Coanda effect oil-water separator would be utilized to clean up oil spills on the ocean.

The use of the Coanda effect separator in an oil-water separating system is schematically illustrated in FIG. 5. An oil spill would be picked up by a surface skimmer 46 and delivered to a Coanda effect separator by a pump 48. A multi-stage Coanda effect separator 50 would extract the oil from the mixture and deliver it to an oil storage tank 52. The substantially oil-free water could be pumped back into the sea or could be pumped back to the input at the surface skimmer for recycling, if desired. Volume can be increased by increasing the size of the Coanda effect separator or by stacking a number of Coanda effect separators in parallel. The separator can provide a highly reliable system because it does not utilize any mechanical moving parts other than a mixture circulating and oil transferring pump which results in less maintenance requirements.

Obviously many modifications and variations of the present invention are possible in light of the above teachings. It is therefore to be understood that within the scope of the appended claims the invention may be practiced otherwise than as specifically described.

We claim:
1. A method of partially separating oil and water from an oil-water mixture comprising:
 a. pumping an oil-water mixture into a bounded region between flat plates in a low flow velocity stream which attaches to a wall in said bounded region to form a Coanda separation bubble within said region;
 b. extracting partially separated oil from said separation bubble; and
 c. extracting partially separated water from said bounded region.

2. The method of claim 1 including the additional steps comprising:
 a. connecting a plurality of bounded regions in series;
 b. successively pumping said partially separated water through each bounded region, thereby creating a separation bubble in each bounded region; and
 c. collecting the separated oil from each bubble.

3. A device for partially separating oil and water from an oil-water mixture utilizing the Coanda effect comprising:
 a. a bounded region having substantially straight adjacent walls which meet at an angle between flat plates to form an enclosed cavity;
 b. means for injecting said oil-water mixture into said cavity parallel to and spaced from one of said walls in a low pressure, high volume flow to prevent emulsification of said oil-water mixture;
 c. means for extracting partially separated oil from said bounded region of said enclosed cavity adjacent said angle formed by said walls;
 d. means for extracting partially separated water from said bounded region of said enclosed cavity;
 e. wherein said device operates essentially in two dimensions to form a separation bubble by attachment of said low pressure flow to one of said walls due to said Coanda effect, thereby causing oil to collect in said separation bubble and partially separate from said oil-water mixture.

* * * * *